United States Patent [19]

Pierce

[11] Patent Number: 4,564,092

[45] Date of Patent: Jan. 14, 1986

[54] TWO SPEED, TWO PULLEY COMPRESSOR DRIVE CLUTCH

[75] Inventors: William C. Pierce, Carrollton, Tex.

[73] Assignee: Pitts Industries, Inc., Dallas, Tex.

[21] Appl. No.: 562,193

[22] Filed: Dec. 15, 1983

[51] Int. Cl.$^4$ ............................................ F16D 27/02
[52] U.S. Cl. ............................ 192/48.2; 192/84 AA
[58] Field of Search ............... 192/48.91, 48.9, 48.8, 192/48.2, 48.1, 84 A, 84 AA, 84 AB

[56] References Cited

U.S. PATENT DOCUMENTS

| | | | |
|---|---|---|---|
| 2,807,147 | 9/1957 | Jacobs | 192/84 AB |
| 2,881,597 | 4/1959 | Jacobs | 192/48.2 |
| 3,062,346 | 11/1962 | Sharpe | 192/48.91 |
| 3,429,192 | 2/1969 | Allen | 192/48.2 |
| 3,463,027 | 8/1969 | Gelb | 192/48.2 |
| 3,565,223 | 2/1971 | Pierce | 192/106.1 |
| 3,675,747 | 7/1972 | Obermark | 192/48.91 |
| 4,170,276 | 10/1979 | Hashimoto et al. | 192/48.91 |
| 4,296,851 | 10/1981 | Pierce | 192/84 C |
| 4,482,038 | 11/1984 | Mason | 192/48.91 |
| 4,488,627 | 12/1984 | Streich et al. | 192/48.2 |

FOREIGN PATENT DOCUMENTS 1575907 1/1970 Fed. Rep. of Germany ..... 192/48.2

Primary Examiner—Magdalen Y. C. Moy

[57] ABSTRACT

An electromagnetic drive clutch for the compressor in an air conditioning system for a bus used both in the city and in over-the-road operation incorporating two drive pulleys of different diameters, concentrically arranged armatures connected with the respective pulleys by a spring assembly, concentrically arranged coil assemblies and a common rotor associated with the coil assemblies and armatures to selectively drive the rotor from the smaller or larger pulley thereby varying the drive speed of the compressor and thus varying the output characteristics of the compressor to enable adequate cooling to be provided for the interior of the bus during over-the-road movement when the engine speed of the bus is relatively high and also adequate cooling during city driving when the engine speed of the bus is relatively low. The specific structural arrangement of the components of the drive clutch enables effective installation in new construction and also easy retrofit onto existing air conditioning compressors for buses with the specific construction and orientation of the components and their functional relationship being different from existing drive clutches for air conditioning compressors.

7 Claims, 3 Drawing Figures

TWO SPEED, TWO PULLEY COMPRESSOR DRIVE CLUTCH

BACKGROUND OF THE INVENTION

1. Field of the Invention

The present invention generally relates to a two-speed electromagnetic clutch for driving an air conditioning compressor from the internal combustion engine of a bus or a similar vehicle subject to operation at various speeds and conditions such as operation over city streets at relatively low speeds with frequent stops and operation over-the-road at relatively high speeds with infrequent stops. The drive clutch includes two pulleys, one having a larger diameter than the other, a common rotor, concentrically arranged armature discs associated with the rotor for driving engagement therewith when concentrically arranged electromagnetic coils on the opposite side of the rotor attracts one of the armatures into driving engagement with the rotor. Each of the armatures is independently connected to the pulleys so that the rotor may be selectively driven from either the larger diameter or smaller diameter pulley with the structural components and association of these components being unique to provide an efficient two-speed drive clutch which may be easily installed in new construction as well as retrofitted into existing structures.

2. Description of the Prior Art

Electromagnetic drive clutches have been provided for selectively driving air conditioning compressors in vehicles in order to maintain the occupants or passenger space in a vahicle at a comfortable temperature and humidity level. Various patents exist covering such structures with my prior U.S. Pat. Nos. 3,565,223 issued Feb. 23, 1971 and 4,296,851 issued Oct. 27, 1981 being typical of such arrangements with the prior patents cited in the above-mentioned patents also being relevant to this subject matter. However, electromagnetic clutches usually include a single pulley driven by a belt from a power take-off pulley on the internal combustion engine of a vehicle which is adequate for most purposes. However, when a vehicle is driven in congested traffic areas, such as in city driving, the input speed to the compressor is reduced and thus the output of the air conditioning compressor is reduced which, in some instances, results in inadequate cooling of the passenger space or occupant space of the vehicle. Efforts have been made to provide two-speed input to a compressor of an air conditioning system with U.S. Pat. Nos. 2,807,147 issued Apr. 29, 1957 and 3,429,192 issued Feb. 25, 1969 relating particularly to such an arrangement. While the problem has been recognized and efforts made to provide an effective solution to such problem, the prior art does not provide an effective solution which is compact, easily installed on existing air conditioning compressors as well as new construction and effective for varying the compressor input drive speed inversely to the rotational speed of the crankshaft of the internal combution engine.

SUMMARY OF THE INVENTION

An object of the present invention is to provide a two-speed electromagnetic drive clutch for an air conditioning compressor such as used in a bus or similar vehicle subject to operation in city driving and over-the-road driving in which the rotational speed of the crankshaft or other power take-off from the internal combustion engine varies subtantially during various modes of operation to enable the output capacity of the air conditioning compressor to be maintained subtantially constant by varying the input rotational speed of the compressor shaft inversely to the rotational speed of the vehicle engine.

Another object of the invention is to provide a two-speed clutch in accordance with the preceding object in which the clutch includes two pulleys oriented alongside each other with one pulley having a pulley groove of a diameter greater than the other pulley with both pulleys being rotatably journalled from the central hub of a rotor disc disposed in axially but closely spaced relation to the pulleys with the larger pulley being rotatably journalled from the smaller pulley.

A further object of the invention is to provide a two-speed clutch in accordance with the preceding objects in which concentrically arranged armatures are interposed between the rotor and pulleys with the outer armature including two poles and connected to the outer pulley through a spring assembly and the inner armature including four poles and connected to the smaller pulley through a spring assembly with the four pole inner armature providing additional torque in view of the lesser radius from the center of rotation of the rotor.

Still another object of the invention is to provide a two-speed clutch including concentrically arranged coil assemblies adjacent the surface of the rotor opposite to the armatures mounted from a non-magnetic coil mount with the structure of the coil assemblies, rotor, armatures and pulleys being such that magnetic interaction between the two clutches is prevented.

A still further object of the invention is to provide a two-speed clutch for driving an air conditioning compressor in accordance with the preceding object which is extremely compact in construction, efficient in selectively driving the compressor from the two pulleys, capable of easy installation in new construction and also easily retrofitted into existing air conditioning compressors, effective and long lasting in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view illustrating a schematic arrangement of the two-speed clutch of the present invention associated with an air conditioning compressor and an internal combustion engine such as used to drive a passenger bus or the like.

DESCRIPTION OF THE PREFERRED EMBODIMENT

Figure 1:
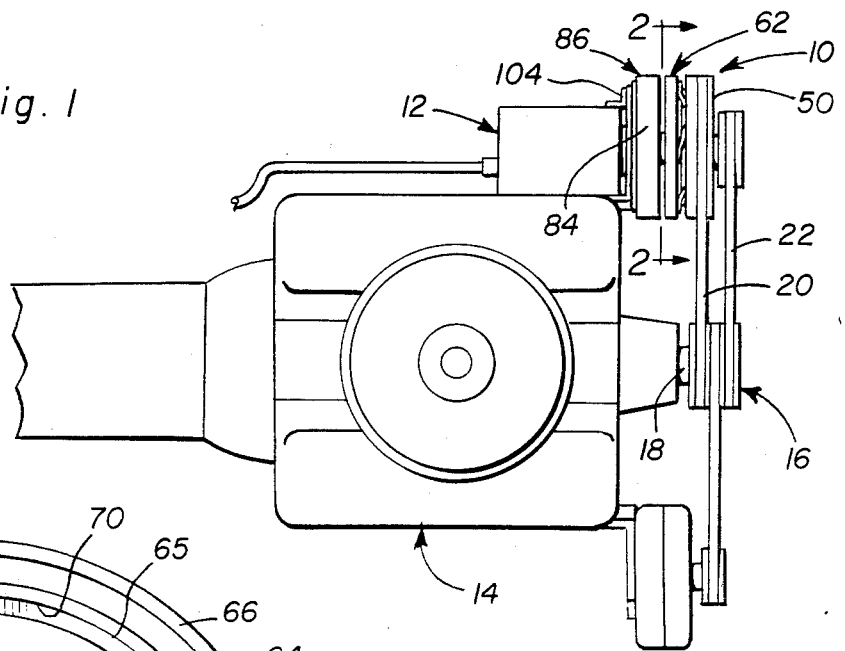

Referring now specifically to the drawings, the two-speed clutch of the present invention is generally designated by reference numeral 10 which is used for driving an air conditioning compressor 12 in the air conditioning system of a vehicle, such as a passenger bus powered by an internal combustion engine 14 having a pulley assembly 16 at the forward end thereof that is connected to the crankshaft 18 or other power take-off shaft drivingly connected with the vehicle engine or drive train. As illustrated, the pulley assembly 16 includes a multiple groove pulley with two of the pulley grooves having V-belts 20 and 22 in a conventional manner with the two V-belts 20 and 22 being closely spaced in relation to each other and generally parallel for driving the two-speed clutch 10 in a manner described in detail hereinafter with the compressor being mounted in such a manner that the belts 20 and 22 may be properly maintained in a taut condition. As described heretofore, the only difference between existing air conditioning drive systems and that disclosed herein is the use of two drive belts 20 and 22 rather than a single drive belt and the two pulley clutch arrangement 10 to be described in detail hereinafter.

As illustrated, the compressor 12 includes an input shaft 24 having a hub 26 of the clutch 10 secured thereon by a conventional key 28 and a retaining bolt-and-washer assembly 30 which screws into the end of the shaft 24 in a conventional manner with the shaft 24 and hub 26 being tapered in a manner to securely lock the hub 26 to the shaft 24 but yet enable removal of the hub 26 when desired by removing the bolt-and-washer assembly 30.

Figure 3:
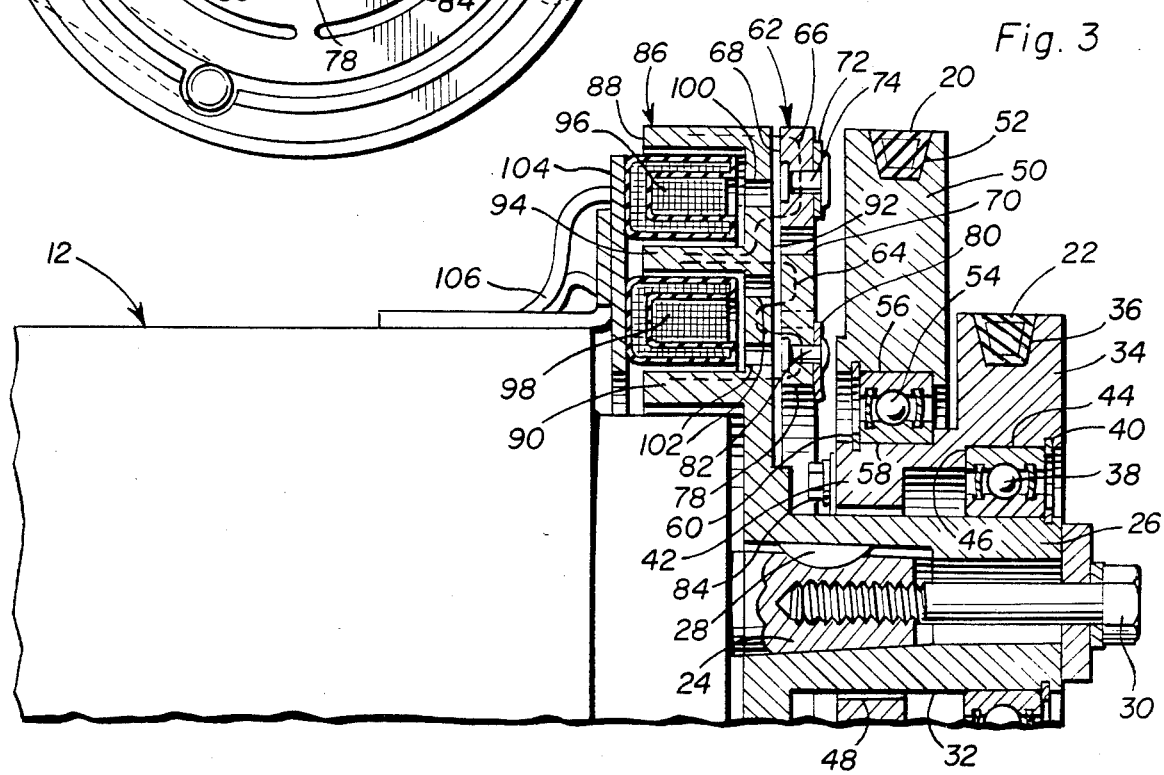
FIG. 3 is a longitudinal sectional view, on an enlarged scale, illustrating the specific orientation of the components of the two-speed clutch.

The hub 26 has an axially extending external surface 32 on which is mounted a smaller diameter pulley 34 having a pulley groove 36 therein receiving the forwardmost drive belt 22 as illustrated in FIG. 3. A bearing assembly 38 journals the pulley 34 from the external surface 32 of the hub 26 with a retainer 40 being provided to retain the bearing assembly 38 in position and to retain the pulley 34 axially on the hub 26.

The pulley 34 includes an inwardly extending hub 42 which includes a recess 44 which receives the bearing assembly 38 against a shoulder 46 and the inner end of the hub 42 is spaced concentrically from the external surface 32 of the hub 26 as indicated by numeral 48. If desired, a second bearing assembly may be provided for the inner end of the hub 42 for effective support thereof on the hub 26 with the single bearing assembly 38 or the dual bearing assembly, if used, serving to rotatably journal the pulley 34 from the hub 26.

A second pulley 50 is mounted inwardly of the pulley 34 and includes a pulley groove 52 receiving the inner drive belt 20 with the diameter of the pulley groove 52 being substantially larger than the diameter of the pulley groove 36. As illustrated, the pulley 50 is disposed closely adjacent the inner surface of the pulley 34 and is disposed in concentric relation to the hub 42 on the pulley 34 and is journalled therefrom by a bearing assembly 54 which is received in a recess 56 in the inner surface of the pulley 50 and a recess 58 in the external surface of the hub 42 with both the recesses 56 and 58 having a shoulder at the inner end thereof and a retaining ring 60 retains the bearing 54 against the shoulders at the inner ends of the recesses 56 and 58 and retains the pulley 50 axially on the hub 42 for relatively free rotation of the pulley 50 in relation to the pulley 34.

Positioned axially inwardly of the larger diameter pulley 50 is an armature assembly generally designated by numeral 62 including an inner armature 64 and an outer armature 66 oriented concentrically of each other and separated by a peripheral slot 70 with the outer armature 66 being connected to the pulley 50 by a plurality of flat leaf springs 72 which are fastened to the armature 66 by rivet type fasteners 74 and fastened to the pulley 50 by a similar rivet type fasteners 76 with the leaf springs enabling axial movement of the outer armature 66. The inner armature 64 is provided with an enlarged central opening 78 concentric with and spaced outwardly from the hub 26 with the inner portion of the inner armature 64 being connected to the inner end of the hub 42 of the smaller diameter pulley 34 by a plurality of flat leaf springs 80 attached to the inner armature 64 by rivet type fasteners 82 and connected to the hub 42 by bolt and washer type fasteners 84 or the like thus drivingly interconnecting the pulley 34 and the inner armature 64 through the leaf springs 80 which enable axial movement of the inner armature 64.

Mounted axially inwardly of the armature 62 is a rotor generally designated by numeral 86 which is in the form of a disc having its inner edge integral with and forming a continuation of the hub 26 and provided with an outer cylindrical flange 88 and an inner cylindrical flange 90. The portion of the hub between the flanges 86 and 90 is in the form of a flat circular plate 92 disposed in spaced relation to the armatures 64 and 66 with the armatures being engageable with the face of the plate 92 so that the plate 92, in effect, is a clutch plate engaged by the armatures 64 and 66 for selectively driving the rotor and thus the hub 26 from either the pulley 34 or the pulley 50. The plate 92 also includes a centrally disposed flange 94 with an outer coil assembly 96 being supported between the outer flange 88 and the central flange 94 and an inner coil assembly 98 is supported between the inner flange 90 and the central flange 94. Also, the plate 92 includes sets of curved slots 100 aligned with the outer coil assembly 96 and two radially spaced sets of curved slots 102 registered with the inner coil assembly 98. The coil assemblies 96 and 98 are supported by a common mount or bracket 104 of nonmagnetic material that is supported from the compressor housing in any suitable manner and electrical conductors 106 are connected to the coil assemblies in a conventional manner.

Figure 2:
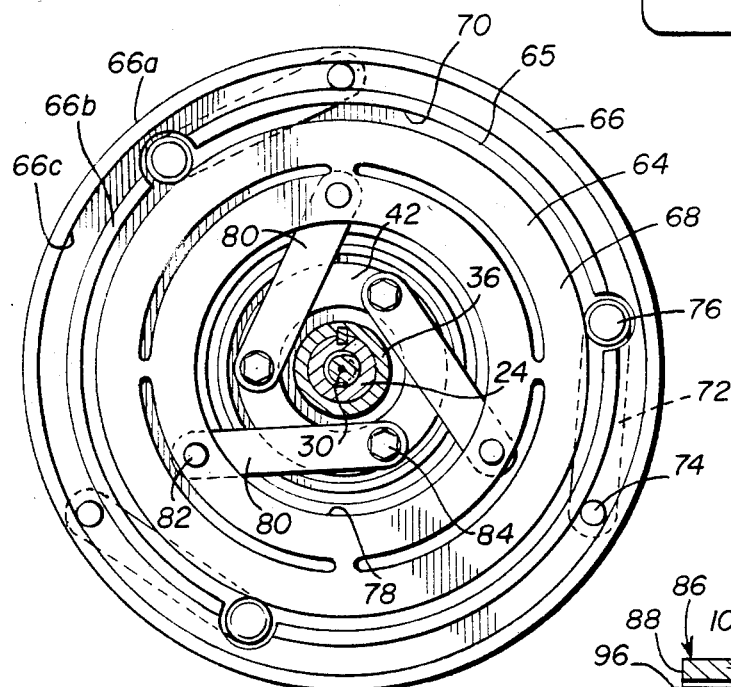
FIG. 2 is a sectional view taken substantially upon a plane passing along section line 2—2 on FIG. 1 illustrating the armature structures and the springs interconnecting the armatures and the pulleys.

As illustrated, the outer armature 66 is constructed with two poles 66a and 66b as illustrated in FIG. 2 separated by a shallow groove 66c that generally is aligned with the set of curved slots 100 in the rotor plate 92 with the dashed line in FIG. 3 illustrating the magnetic flux flow path through the two poles. The inner armature 64 includes four arcuate slots 65 generally in the center thereof with the inner armature 64 including four poles defined by the sets of arcuate slots 102 with the path of flux flow being illustrated by the broken line in FIG. 3. Thus, a common rotor is used but two separate coil assemblies, armatures and pulleys are used with the outer armature disc being of two pole construction with the inner armature disc of four pole construction which produces adequate torque in this compact clutch construction. The outer armature disc needs only two pole construction thereby permitting an economy of space because of the large radius which will still produce sufficient torque to drive the compressor with the four pole inner armature disc providing sufficient torque even with the smaller radius to drive the compressor. As illustrated, each of the inner and outer armatures are independently connected to the pulleys with a set of three or more leaf springs which prevents magnetic interaction of the two clutches with the non-magnetic mounting 100 also preventing magnetic interaction. Thus, with this invention, the double field assembly is mounted on the compressor with bolts and washers and piloting on the outside diameter of the mounting plate which is preferably an aluminum stamping. The common rotor provides preassembly of two pulleys of different diameters, each pulley having an armature connected thereto by means of flat springs with the pulley grooves being of any desired size. A conventional bolt-and-washer assembly secures this assembly to the tapered and keyed compressor shaft.

By providing the small pulley with a diameter of 5 inches, an efficient operating speed of the compressor may be maintained, above about 1800 rpms, at a relatively low engine rpm. It is desired not to run the compressor above 3000 rpm. Thus, when the engine speed exceeds 2200 rpms, a centrifugal or electronic switch, of conventional and well known construction, will switch to the larger pulley which may be 8 inches in diameter so that the compressor speed will remain about 1700 rpms. With this arrangement, maximum engine speeds will not overspeed the compressor but yet low engine speeds will maintain the compressor operating at an efficient speed to provide adequate output for retaining the bus or other vehicle properly cooled. The switch circuit may include a delay timer to prevent fast cycling thereby resulting in subtantially an ideal constant speed drive for the air conditioning system to overcome existing problems where in city driving, the vehicle engine does not "rev up" enough to drive the compressor at speeds sufficiently to properly cool the bus or other vehicle. Much of the time in city driving involves idling of the engine which is the worst possible condition for the air conditioning system when maximum demand is needed. The solution of providing the two-speed clutch permits a relatively significantly higher compressor drive speed at the low end of the engine speed and then switches to a relatiely normal drive speed of the compressor at the higher engine speeds such as encountered in highway driving.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An electromagnetic clutch for driving an input shaft of a compressor in an air conditioning system of a bus or similar vehicle by connecting the input shaft to an output shaft of an internal combustion engine subject to frequent periods of low rotational output speed and high rotational output speed with the clutch providing approximately constant drive speed to the air conditioning compressor for efficient cooling, said clutch comprising a pair of pulleys with one pulley having a diameter larger than the other, a rotor having a hub connected with the input shaft of the air conditioning compressor, a pair of armature disposed in close axially spaced relation to one side of the rotor, means connecting the armatures to the larger and smaller diameter pulleys and enabling axial movement of the armatures into driving engagement with the rotor and a pair of coil assemblies supported stationarily adjacent the rotor in opposed relation to the armatures for selectively moving the armatures into driving engagement with the rotor for transferring driving force from selective pulleys to the rotor and input shaft of the air conditioning compressor to enable substantially constant input speed to the air conditioning compressor when the vehicle engine speed varies considerably.

2. An electromagnetic clutch for driving an input shaft of a compressor in an air conditioning system of a bus or similar vehicle by connecting the input shaft to an output shaft of an internal combustion engine subject to frequent periods of low rotational output speed and high rotational output speed with the clutch providing approximately constant drive speed to the air conditioning compressor for efficient cooling, said clutch comprising a pair of pulleys with one pulley having a diameter larger than the other, a rotor having a hub connected with the input shaft of the air conditioning compressor, a pair of armatures disposed in close axially spaced relation to one side of the rotor, means connecting the armatures to the larger and smaller diameter pulleys and enabling axial movement of the armatures into driving engagement with the rotor and a pair of coil assemblies supported stationarily adjacent the rotor in opposed relation to the armatures for selectively moving the armatures into driving engagement with the rotor for transferring driving force from selective pulleys to the rotor and input shaft of the air conditioning compressor to enable substantially constant input speed to the air conditioning compressor when the vehicle engine speed varies considerably, said armatures being concentrically arranged inner and outer armatures, said coil assemblies being concentrically arranged inner and outer coil assemblies aligned with the armatures, said means connecting the armatures to the pulleys including a purality of flat leaf springs secured to the armatures and pulleys to drive the armatures from the pulleys with the flat leaf springs enabling axial movement of the armatures in relation to the rotor.

3. The structure as defined in claim 2 wherein said rotor includes a set of arcuate slot in alignment with the outer armature and outer coil assembly to form a two pole armature for engaging the outer armature with the rotor with a predetermined force, said rotor including a pair of radially spaced concentrically arranged sets of slots aligned with the inner coil assembly and inner armature to provide a four pole armature for pulling the inner armature into engagement with the rotor to provide sufficient rotational torque with the smaller radius of the inner armature.

4. The structure as defined in claim 3 wherein the pulleys are arranged axially with the axially inner pulley closest to the armatures having a larger diameter and the axially outer pulley remote from the armatures having a smaller diameter, said outer pulley including an axial hub journalled on the rotor hub, the inner pulley being rotatably mounted on the hub of the smaller outer pulley thereby providing a compact structural arrangement of the pulleys with both pulleys being supported from the rotor hub.

5. The structure as defined in claim 4 wherein said rotor includes three concentrically arranged flanges projecting therefrom opposite to the armatures with the flanges defining annular spaces receiving the coil assemblies, and non-magnetic means mounting the coil assemblies stationarily from the compressor.

6. The structure as defined in claim 5 together with a bearing assembly interposed between the smaller pulley and the rotor hub, and a bearing assembly interposed between the hub on the smaller pulley and the larger pulley to rotatably support the larger pulley from the hub on the smaller pulley.

7. A drive clutch having, in combination, armature disks axially movable and concentrically arranged along a common axis, an axially fixed hub rotatable about said axis, a rotor fixed to said hub and in close axially spaced relation to said armature disks, concentrically arranged coil assemblies adjacent the rotor, means stationarily supporting the coil assemblies whereby selective energization will cause axial movement of one of the armature disks into frictional driving engagement with said rotor, a pair of axially fixed members rotatable about said axis, and flat leaf springs drivingly connecting the rotatable members and the armature disks and enabling axial movement of the armature disks into frictional driving engagement between the armature disks and rotor for drivingly connecting the hub and one of said rotatable members.

* * * * *